Sept. 26, 1950   J. O. STEPHENSON ET AL   2,523,734
TRANSMISSION GRIPPING DEVICE
Filed Oct. 15, 1948                           2 Sheets-Sheet 1
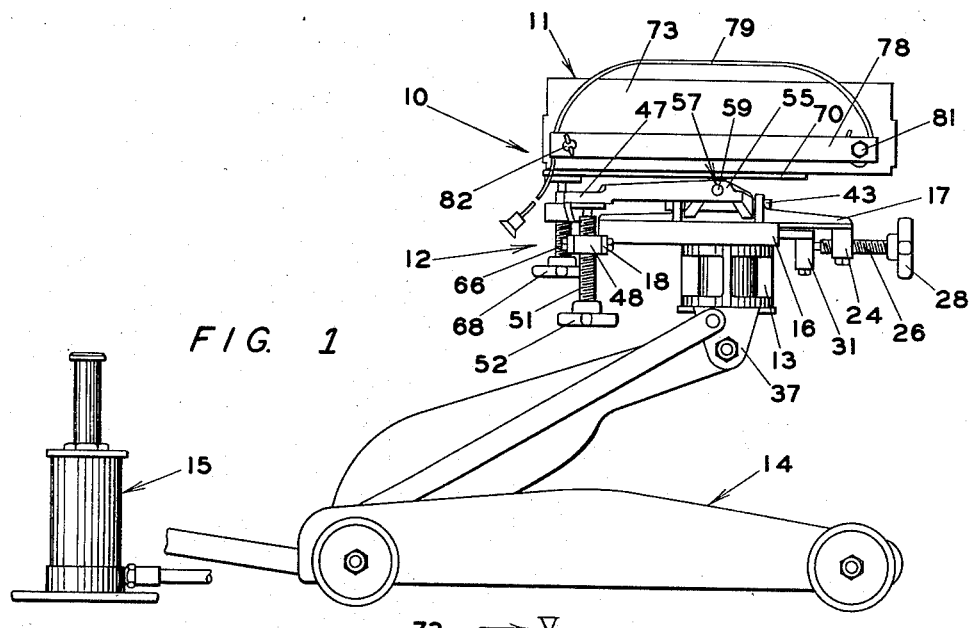
FIG. 1
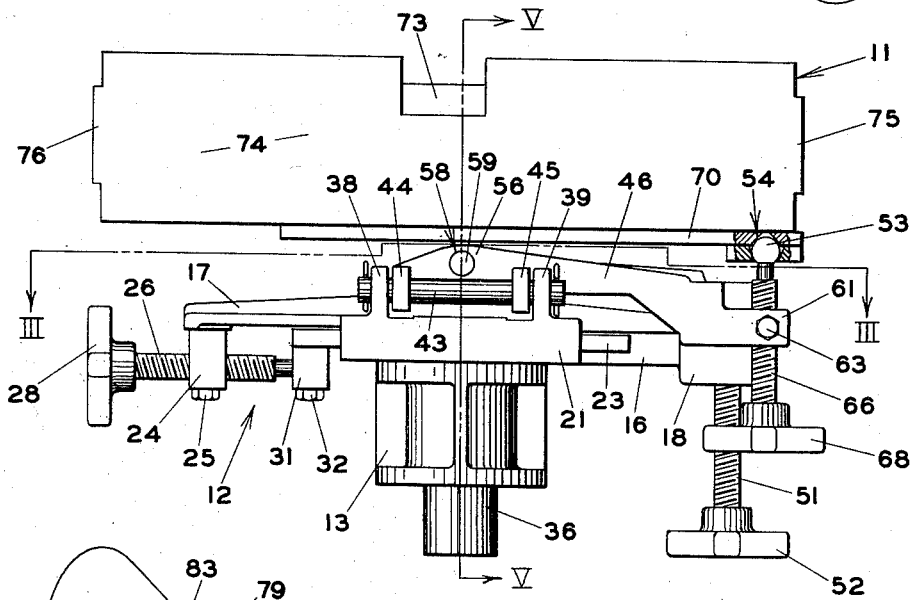
FIG. 2
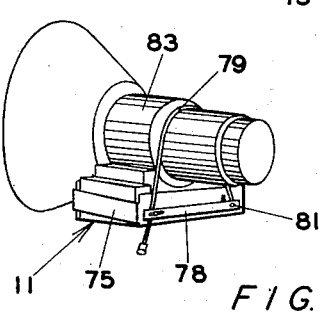
FIG. 6
Inventor
JOHN O. STEPHENSON
JOHN H. HILLIS
Attorney Sept. 26, 1950   J. O. STEPHENSON ET AL   2,523,734
TRANSMISSION GRIPPING DEVICE Filed Oct. 15, 1948   2 Sheets-Sheet 2

Inventor
JOHN O. STEPHENSON
JOHN H. HILLIS
By
Attorney

Patented Sept. 26, 1950

2,523,734

UNITED STATES PATENT OFFICE 2,523,734

TRANSMISSION GRIPPING DEVICE

John O. Stephenson and John H. Hillis, Detroit, Mich.; said Hillis assignor to said Stephenson Application October 15, 1948, Serial No. 54,685

5 Claims. (Cl. 248—184)

1

This invention relates in general to a universally adjustable gripping device and more particularly to a type thereof for engaging and positioning a hydraulic transmission.

Certain motor vehicles have heavy, cumbersome parts, such as a transmission, which must be removed to be repaired and must then be replaced in the vehicle. This has created a severe problem of handling. The present, conventional means for engaging and positioning a hydraulic, or other heavy, transmission during its removal and replacement, such, for example, as the transmission found on the 1948 Buick automobile, includes intricate equipment which is not easily adaptable, if at all, to use in the average small repair garage or service station, and is otherwise generally unsatisfactory.

Accordingly, a primary object of this invention is the provision of a gripping device for positively engaging a heavy, cumbersome vehicle part, such as a hydraulic transmission during the removal and/or replacement thereof in a motor vehicle and the usefulness of the device with other heavy parts will be apparent.

A further object of this invention is the provision of a gripping device as aforesaid which is universally adjustable and can be easily and removably supported upon an appropriate support device.

A further object of this invention is the provision of a gripping device as aforesaid which is less expensive, more effective and easier to use than present means for engaging and positioning a heavy, cumbersome vehicle part, such as a hydraulic transmission.

Other objects and purposes of this invention will become apparent to persons familiar with this type of equipment upon referring to the accompanying drawings and upon reading the following specification.

In meeting those objects and purposes heretofore mentioned, as well as others incidental thereto and associated therewith, we have provided a transmission gripping device comprised of a gripping fixture supported upon a universally adjustable positioning mechanism, which is in turn supported upon a swivel post. The entire transmission gripping device may be removably supported, by means of said swivel post, upon a suitable lift means, such as disclosed in our copending application entitled "Hydraulic Lift Mechanism" and filed concurrently herewith.

For illustrations of a preferred embodiment of our invention, attention is directed to the accompanying drawings in which:

Figure 1 is a side elevation view of our transmission gripping device mounted upon a suitable lifting means.

Figure 2 is an elevation view of the opposite side of the gripping device shown in Figure 1.

2

Figure 3:
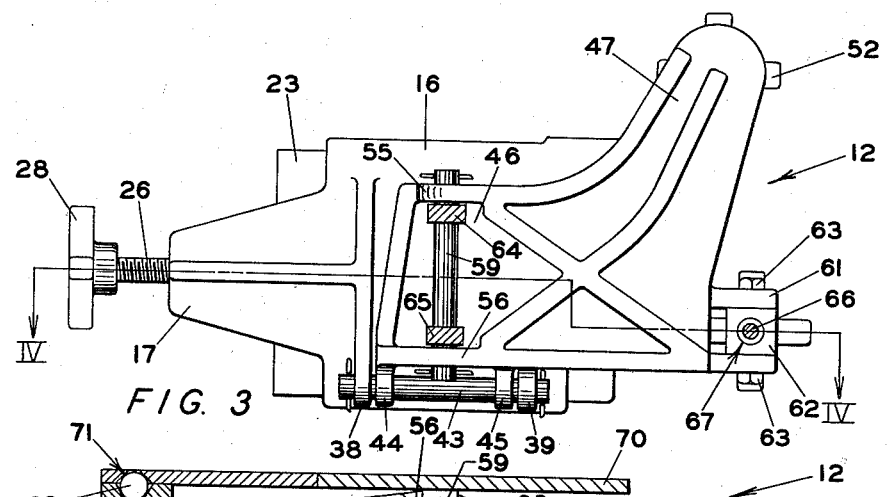
Figure 3 is a sectional view taken along the line III—III of Figure 2.
Figure 4:
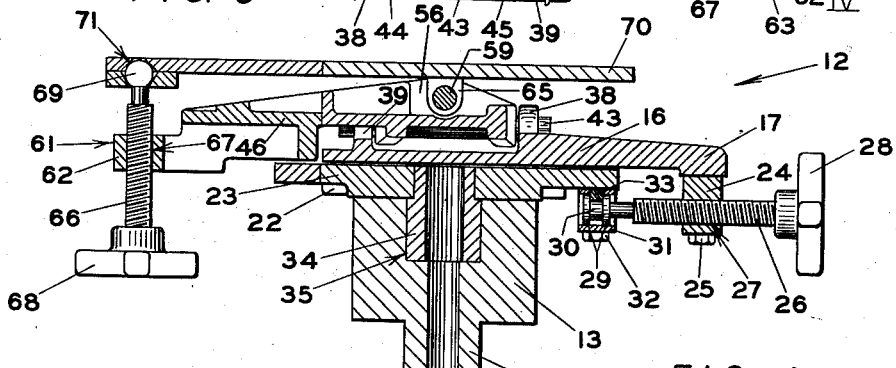

Figure 4 is a sectional view taken along the line IV—IV of Figure 3.

Figure 5:
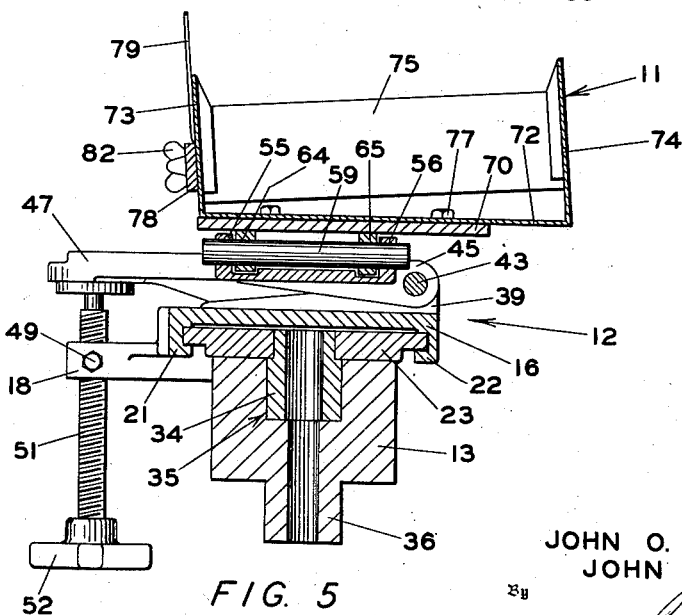

Figure 5 is a sectional view taken along the line V—V of Figure 2.

Figure 6 shows a hydraulic transmission engaged by the gripping fixture.

Construction

The transmission gripping device 10, opposite sides of which are shown in Figures 1 and 2, is comprised of a gripping fixture 11 which is supported upon a universally adjustable positioning mechanism 12, hereinafter referred to as the positioner. The positioner 12 is removably supportable for rotation about a vertical axis upon a swivel post 13 which post may in turn be removably supportable for rotation about a vertical axis upon any appropriate support means such as the hydraulic lifting means 14. Since the hydraulic lifting means 14 and hydraulic pump 15, which have been particularly designed for use with the transmission gripping device 10 to which this invention relates, are fully disclosed and described in our application entitled "Hydraulic Lift Mechanism," filed concurrently herewith, further details relating thereto will be omitted from this application. It will, of course, be understood that the device herein disclosed may also be used for other purposes than those above indicated and may be used with other lifting means, such as an ordinary lifting jack having a vertically movable post.

For the purpose of convenience in description the terms "leftward" or "leftwardly" and "rightward" or "rightwardly" as used in the following specification will be understood to mean leftwardly and rightwardly of the device when positioned as appearing in Figures 1 and 4. The terms "upper" or "upwardly" and "lower" or "downwardly" shall be understood to refer to the device when positioned and/or operating in its normal manner of use.

The positioner 12 (Figures 1 through 5) is comprised of an elongated slide plate 16 which is preferably but not necessarily cast from a suitable material such as aluminum or steel and is substantially rectangular in shape. The said slide plate 16 has an integral, horizontal, adjustment arm 17 (Figures 3 and 4) which extends from the rightward end of the said slide plate, and a lateral pivot yoke 18 which extends horizontally away from one side of the said slide plate adjacent to the leftward end thereof. Said slide plate is provided with a pair of parallel, integral, downwardly extending slide support flanges 21 and 22 along the opposite longitudinal edges thereof for slidably engaging a pair of opposite edges of a base plate 23. The said slide plate, which is substantially parallel to said base plate, may be moved horizontally, leftwardly and/or rightwardly with respect to said base plate.

A screw support block 24 depends from the rightward end of the longitudinal adjustment arm 17 and is secured thereto by any appropriate means such as the bolts 25. A horizontal adjustment screw 26 is threadedly received through a suitable threaded opening 27 in the screw support block 24 so that it is substantially parallel to the horizontal end to end axis of the said slide plate 16. The rightward or outer end of the screw 26 (Figure 4) is provided with a conventional handle 28 and the inner or leftward end of the screw is provided with a pair of spaced, parallel, circumferential ridges 29. The inner end of the screw, 26 having said ridges 29, is rotatably supported within a slide adjustment block 31 which depends from and is secured, as by means of the bolts 32, to that end of the base plate 23 extending toward the screw support block 24. A lock pin 33 which is held fixedly with respect to the slide adjustment block 31 extends into the space 30 between the circumferential ridged 29 on the adjustment screw 26, thereby preventing disengagement of the screw 26 from the slide adjustment block 31 while permitting said screw to rotate therewithin. Thus, by appropriate rotation of the handle 28, hence of the screw 26, the slide plate 16 may be moved either leftwardly or rightwardly with respect to the base plate 23.

The base plate 23 is preferably provided with a vertical circular opening therethrough into which a cylindrical connecting post 34 (Figures 4 and 5) is snugly received, said post being secured to said base plate by any suitable means, such as welding. The connecting post 34, which extends downwardly from the base plate 23, is slidably engaged within a corresponding, cylindrical recess 35 in the top of the swivel post 13. The swivel post 13 is provided with an integral, downwardly extending, coaxial, pivot post 36, which post may be removably supported within an appropriate corresponding opening in the lift head 37 (Figure 1) of the lifting means 14 for rotation with respect thereto about a vertical axis.

The slide plate 16 is provided with a pair of sloping, substantially parallel, spaced, upwardly extending, integral, pivot ridges 38 and 39 which are highest adjacent to that edge of the base plate remote from the lateral pivot yoke 18. A pair of horizontal pivot openings are provided in the high ends of said ridges 38 and 39, for rotatable support of a longitudinal pivot shaft 43. A pair of spaced pivot bosses 44 and 45 (Figures 2 and 3), which are secured to and extend horizontally from one edge of a substantially rectangular pivot plate 46 near the rightward end thereof, are rotatably supported upon the longitudinal pivot shaft 43 intermediate the pivot ridges 38 and 39. A lateral pivot arm 47 (Figures 3 and 5), which is integral with the pivot plate 46, extends horizontally away from said pivot plate 46 on the opposite side thereof from the pivot bosses 44 and 45, near the leftward end thereof, and directly over the lateral pivot yoke 18 of the slide plate 16.

The lateral pivot yoke 18 is provided with a pivot block 48 which is pivotally supported upon said pivot yoke 18 by means of the pivot bolts 49. A lateral tilt screw 51, which is threadedly received through an appropriately threaded vertical opening in the pivot block 48, has a handle 52 at its lower end. The upper end of said screw 51 is provided with an integral pivot ball 53 which is rotatably held within the socket 54 near the outer end of the lateral pivot arm 47. Thus, the pivot plate 46 may be pivoted upon the longitudinal pivot shaft 43 upwardly or downwardly with respect to the base plate 16 by appropriate rotation of the lateral tilt screw 51.

A longitudinal pivot yoke 61 (Figures 3 and 4), which is integral with and extends horizontally from the leftward end of the pivot plate 46 pivotally supports a pivot block 62 by means of the pivot screws 63. The pivot plate 46 is provided with a pair of spaced, upwardly extending, substantially parallel shaft bosses 55 and 56 (Figures 3, 4 and 5) adjacent to that end thereof pivotally supported upon the longitudinal pivot shaft 43. Appropriate pivot openings 57 and 58 (Figures 1 and 2) are provided in the shaft bosses 55 and 56, respectively, for rotatable support of a longitudinal pivot shaft 59.

A pair of pivot lugs 64 and 65 which are secured, as by welding, to the bottom of an elongated rectangular tilt table 70 are rotatably supported upon the lateral pivot shaft 59 intermediate the shaft bosses 55 and 56 of the pivot plate 46. The tilt table 70, which may be fabricated from any suitable material, such as aluminum or steel plate, is positioned with its lengthwise axis substantially parallel to the lengthwise axis of the slide plate 16 and is further positioned so that one end thereof extends over the longitudinal pivot yoke 61 on said pivot plate 46.

A longitudinal tilt screw 66, which is threadedly received through a suitably threaded, vertical opening 67 in the pivot block 62 (Figures 2, 3 and 5), is provided with a handle at the lower end thereof. The upper end of said screw 66 is provided with an integral pivot ball 69 which is rotatably secured within the socket 71 provided in that end of the tilt table 70 extending over the longitudinal pivot yoke 61. Thus, the tilt table 70 may be pivoted upon the lateral pivot shaft 59 upwardly or downwardly with respect to the pivot plate 46 by appropriate rotation of the longitudinal tilt screw 66.

The gripping fixture 11 (Figures 1, 2 and 5) is comprised of a bottom sheet 72 and side sheets 73 and 74, which side sheets are connected at their corresponding ends by a pair of end strips 75 and 76. The bottom sheet 72 may be secured to and supported upon the tilt table 70 by means of bolts 77.

A cable gripping strip 78 is secured to one side sheet, here the side sheet 73, of the lifting means 11. One end of a locking cable 79 (Figure 1) is secured under the rightward end of said cable gripping strip 78 by means of a bolt 81, while the other end of said cable 79 is releasably gripped between the leftward end of the cable gripping strip 78 and the side sheet 73 by means of a wing nut 82. The locking cable 79 is provided for the purpose of preventing the accidental displacement of the hydraulic transmission 83 (Figure 6) from the gripping fixture 11.

It will be recognized that although the gripping fixture 11 hereinabove described is designed specifically for engagement and support of a particular hydraulic transmission, said gripping fixture 11 may be modified in design for use with other cumbersome vehicle parts, such as conventional transmissions or differentials, without departing from the scope of this invention.

It will also be understood that the vertical range of the lifting means 14 may be supplemented by inserting suitable spacers between the swivel post 13 and the lift head 37 and encircling the depending part 36 of the swivel post.

Operation

The transmission gripping device 10 is preferably used in conjunction with a suitable lift means, such as the lifting means 14 (Figure 1). Thus, the gripping device 10 may be brought up into engagement with a transmission to be removed from a motor vehicle, or the transmission may be loaded upon and secured to said gripping device for proper positioning thereby while said transmission is being connected to said motor vehicle. However, it will be recognized that the transmission gripping device 10 may be mounted upon a fixed pedestal and the motor vehicle raised or lowered with respect thereto.

If the gripping device 10 is to be used in conjunction with a hydraulic lifting means 14, the pivot post 36 is slidably received within a suitable opening in the lift head 37 of said hydraulic lifting means for rotation with respect thereto about a vertical axis. Thus, the gripping device 10 may be swung through 360 degrees in a horizontal plane. Since the pivot post 36 and the connecting post 34, which is secured to the base plate 23, are preferably of the same diameter, the swivel post may be removed entirely and the opening in the lift head 37 engaged by the connecting post 34. Accordingly, the swivel post 13 acts as a removable spacer between the gripping device 10 and the means supporting same.

The universally adjustable positioning mechanism 12 which is disposed between the gripping fixture 11 and the means supporting the gripping device 10 permits moderate adjustment of the gripping fixture 11 to any angle or tilted position desired or required for engaging or positioning a hydraulic transmission under a motor vehicle while removing or replacing said transmission. The horizontal adjustment screw 26 (Figures 2 and 4), by controlling the horizontal movement of the slide plate 16 with respect to the base plate 23, also controls the horizontal positioning of the pivot plate 46, the tilt table 70, the gripping fixture 11 and parts associated therewith. The lateral tilt screw 51 (Figures 1 and 5) controls the pivotal movement of the pivot plate 46, as well as the tilt table 70 supported thereon, about horizontal, longitudinal axis substantially parallel with the axis of the horizontal adjustment screw 26. Thus, the lateral tilt screw 51 controls the tilting of the gripping fixture 11, supported upon the tilt table 70 (Figure 5), substantially around its longitudinal axis.

The longitudinal tilt screw 66 controls the pivotal movement of the tilt table 70 about a horizontal, lateral axis substantially perpendicular to said longitudinal axis and said horizontal screw axis. Thus, the longitudinal tilt screw controls the tilting of the gripping fixture 11 substantially around its lateral axis.

Accordingly, it will be seen that the positioner 12 controls the tilting of the gripping fixture 11 around both its longitudinal and lateral axis, as well as controlling the horizontal movement thereof with respect to the means, such as the hydraulic lifting means 14, supporting the entire gripping device 10.

The hydraulic transmission 83 (Figure 6) is secured to the gripping fixture 11 by means of cable gripping strip 78 and the locking cable 79 releasably secured to the gripping fixture 11. Thus, the gripping fixture can be tilted moderately in any desired direction while supporting said transmission without running the risk of tipping it out of the fixture.

Although the above mentioned drawings and description apply to one particular, preferred embodiment of the invention, it is not my intention, implied or otherwise, to eliminate other variations or modifications which do not depart from the scope of the invention unless specifically stated to the contrary in the hereinafter appended claims.

We claim:

1. In a device for gripping and positioning a hydraulic transmission, the combination comprising: a lift means; a swivel post removably supported upon said lift means for rotation with respect thereto about a vertical axis; a base plate removably supported upon said swivel post for rotation with respect thereto about a vertical axis; an elongated slide plate slidably supported upon said base plate for horizontal movement in a lengthwise direction, said slide plate having opposite ends and opposite edges; a horizontal screw threadedly supported upon one end of said slide plate and rotatably secured to the adjacent edge of said base plate for moving said slide plate with respect to said base plate; a lateral pivot yoke secured to one edge of said slide plate near the other end thereof and a first pivot block pivotally supported within said yoke; an elongated, substantially rectangular pivot plate having opposite ends and opposite edges pivotally supported along one edge near one end thereof upon said slide plate along the other edge and near said one end thereof; a pivot arm secured to the other edge of said pivot plate near the other end thereof, said pivot arm extending directly over said first pivot block; a first vertical screw threadedly supported upon said first pivot block and rotatably secured at its upper end to said pivot arm for pivoting said pivot plate with respect to said slide plate through the arc of a circle defining a plane perpendicular to the axis of said horizontal screw; a longitudinal pivot yoke secured to the other end of said pivot plate and a second pivot block pivotally supported within said longitudinal yoke; a tilt table pivotally supported upon said pivot plate near said one end thereof, said table extending over said second pivot block; a second vertical screw threadedly supported upon said second pivot block and rotatably secured at its upper end to said tilt table for pivoting said table with respect to said pivot plate through an arc of a circle defining a plane perpendicular to said first named plane and said pivot plate; an elongated rectangular gripping fixture supported upon said tilt table for engaging said transmission, said tray being tiltable substantially about its longitudinal axis by pivotal movement of said pivot plate with respect to said slide plate, and being tiltable substantially about its lateral axis by pivotal movement of said tilt table with respect to said pivot plate; and a locking cable releasably secured to said gripping fixture for securing said transmission thereto.

2. In a device for gripping and positioning a hydraulic transmission, the combination comprising: a base means; a base plate pivotally supported upon said base means for rotation with respect thereto about a vertical axis; an elongated slide plate slidably supported upon said base plate for horizontal movement with respect thereto said base plate having first and second longitudinal edges; a horizontal screw threadedly supported upon one end of said slide plate and rotatably secured to said base plate for moving said slide plate with respect to said base plate; a lateral pivot yoke secured to said slide plate along said first edge thereof and a first pivot block pivotally supported within said yoke; an elongated pivot plate having first and second longitudinal edges pivotally supported along said first edge near one end thereof upon said slide plate along said second edge thereof; a pivot arm secured to said second longitudinal edge of said pivot plate, said pivot arm extending over said first pivot block; a first vertical screw threadedly supported upon said first pivot block and rotatably secured to said pivot arm for pivoting said pivot plate with respect to said slide plate about a horizontal, longitudinal axis parallel to the axis of said horizontal screw; a longitudinal pivot yoke secured to that end of said pivot plate remote from said pivoted end and a second pivot block pivotally supported within said longitudinal yoke; a table pivotally supported upon said pivot plate near one end thereof, said table extending over said second pivot block; a second vertical screw threadedly supported upon said second pivot block and rotatably secured to said table for pivoting said table with respect to said pivot plate about a horizontal, lateral axis perpendicular to said longitudinal axis and said horizontal screw axis; gripping fixture supported upon said table for engaging said transmission, the center of gravity of said fixture when loaded in the normal manner being vertically aligned with the intersection of said longitudinal and lateral axes; and means for securing said transmission to said fixture.

3. In a device for gripping and positioning a hydraulic transmission, the combination comprising: a base means; a base plate removably supported upon said base means for rotation with respect thereto about a vertical axis; a slide plate slidably supported upon said base plate; means including a horizontal screw for moving said slide plate horizontally with respect to said base plate; a pivot plate pivotally supported upon said slide plate, and means including a first vertical screw for pivoting said pivot plate with respect to said slide plate about a horizontal, longitudinal axis parallel with the axis of said horizontal screw; a table pivotally supported upon said pivot plate, and means including a second vertical screw for pivoting said pivot plate with respect to said slide plate about a horizontal, lateral axis perpendicular to the said horizontal screw axis and said longitudinal axis; a gripping fixture supported upon said table for engaging said transmission, the center of gravity of said fixture when loaded in the normal manner being vertically aligned with the intersection of said longitudinal and lateral axes; and means for securing said transmission to said fixture.

4. In a device for gripping and positioning a gear housing, the combination comprising: a base means; a base member pivotally supported upon said base means for rotation with respect thereto about a vertical axis; an elongated slide member slidably supported upon said base member for horizontal movement with respect thereto, a horizontal screw threadedly supported upon one of said slide member and said base member and rotatably secured to the other of said slide member and said base member for moving said slide member with respect to said base member; a lateral pivot yoke secured to said slide member and a first pivot block pivotally supported on said yoke; an elongated pivot member pivotally supported upon said slide member; a pivot arm secured to said pivot member and extending therefrom from an edge spaced from the point of pivoting said pivot member to said slide member, said pivot arm extending over said first pivot block; a first vertical screw threadedly supported upon said first pivot block and rotatably secured to said pivot arm for pivoting said pivot plate with respect to said slide member about a horizontal axis; a longitudinal pivot yoke secured to a portion of said pivot member spaced from the point of pivotal support of said pivot member and a second pivot block pivotally supported within said longitudinal pivot yoke; a table pivotally supported upon said pivot member, said table extending over said second pivot block; a second vertical screw threadedly supported upon said second pivot block and rotatably secured to said table for pivoting said table with respect to said pivot member about a horizontal axis perpendicular to the last above named axis; and means supported upon said table for engaging said transmission.

5. In a device including a floor based support for gripping and positioning a gear housing, the combination comprising: a base member having means adapting it for pivotal support upon said support means for rotation with respect thereto about a vertical axis; an elongated slide member slidably supported upon said base member for horizontal movement with respect thereto; a horizontal screw threadedly supported upon one of said slide members and said base member and rotatably secured to the other of said slide member and said base member for moving said slide member with respect to said base member; a lateral pivot yoke secured to said slide member and a first pivot block pivotally supported on said yoke; an elongated pivot member pivotally supported upon said slide member; a pivot arm secured to said pivot member and extending therefrom from an edge spaced from the point of pivoting said pivot member to said slide member, said pivot arm extending over said first pivot block; a first vertical screw threadedly supported upon said first pivot block and rotatably secured to said pivot arm for pivoting said pivot plate with respect to said slide member about a horizontal axis; a longitudinal pivot yoke secured to a portion of said pivot member spaced from the point of pivotal support of said pivot member and a second pivot block pivotally supported within said longitudinal pivot yoke; a table pivotally supported upon said pivot member, said table extending over said second pivot block; a second vertical screw threadedly supported upon said second pivot block and rotatably secured to said table for pivoting said table with respect to said pivot member about a horizontal axis; a horizontal axis perpendicular to the last above named axis; and gripping means supported upon said table for engaging said transmission.

JOHN O. STEPHENSON.
JOHN H. HILLIS.

REFERENCES CITED

The following references are of record in the file of this patent:

UNITED STATES PATENTS

| Number | Name | Date |
|---|---|---|
| 1,061,102 | Morton et al. | May 6, 1913 |
| 1,758,240 | Roach | May 13, 1930 |
| 2,161,909 | Bornmann | June 13, 1939 |
| 2,296,674 | Ingels | Sept. 22, 1942 |

FOREIGN PATENTS

| Number | Country | Date |
|---|---|---|
| 632,161 | France | Jan. 6, 1928 |